United States Patent
Lutzenberger

(10) Patent No.: US 12,276,523 B2
(45) Date of Patent: Apr. 15, 2025

(54) METHODS AND SYSTEMS FOR PROVIDING A REAL-TIME VIEWSHED VISUALIZATION

(71) Applicant: onXmaps, Inc., Missoula, MT (US)

(72) Inventor: Bert Jeffrey Lutzenberger, Hood River, OR (US)

(73) Assignee: ONXMAPS, INC., Missoula, MT (US)

(*) Notice: Subject to any disclaimer, the term of this patent is extended or adjusted under 35 U.S.C. 154(b) by 181 days.

(21) Appl. No.: 18/085,992

(22) Filed: Dec. 21, 2022

(65) Prior Publication Data

US 2023/0332922 A1 Oct. 19, 2023

Related U.S. Application Data

(60) Provisional application No. 63/331,625, filed on Apr. 15, 2022.

(51) Int. Cl.
G01C 21/00 (2006.01)
G06T 15/60 (2006.01)
G06T 17/05 (2011.01)

(52) U.S. Cl.
CPC .......... *G01C 21/3859* (2020.08); *G06T 15/60* (2013.01); *G06T 17/05* (2013.01)

(58) Field of Classification Search
CPC .... G01C 21/00; G01C 21/3859; G06T 15/60; G06T 17/05
See application file for complete search history.

(56) References Cited

U.S. PATENT DOCUMENTS

| | | | |
|---|---|---|---|
| 6,664,962 B1 | 12/2003 | Komsthoeft et al. | |
| 8,755,566 B1 | 6/2014 | McLaughlin et al. | |
| 9,041,708 B2 | 5/2015 | Baxter et al. | |
| 9,530,244 B2 | 12/2016 | Acree | |
| 10,424,108 B2 | 9/2019 | Shkolnikov | |
| 10,460,602 B1 | 10/2019 | Dorne et al. | |
| 2004/0248521 A1 | 12/2004 | Moursund et al. | |
| 2014/0337772 A1* | 11/2014 | Cervelli | G06T 11/001 715/766 |

(Continued)

FOREIGN PATENT DOCUMENTS

AU 2013237642 B2 7/2019
WO WO-2023200569 A1 10/2023

OTHER PUBLICATIONS

PCT/US2023/016046 International Search Report dated Jun. 23, 2023.

(Continued)

*Primary Examiner* — Tan Q Nguyen
(74) *Attorney, Agent, or Firm* — WILSON SONSINI GOODRICH & ROSATI

(57) ABSTRACT

The present disclosure provides methods and systems for providing a real-time viewshed visualization. Provided here is a method for generating viewshed map for one or more client nodes, comprising (a) receiving a first set light source data associated with an area; (b) obtaining a set of elevation data associated with the area; (c) generating a shadow map based at least in part on the first set light source data and the elevation data associated with the area; (d) receiving interactive position data from the one or more client nodes; and (e) generating a real-time viewshed map visualization of the area by rendering the shadow map based on the interactive position data.

20 Claims, 8 Drawing Sheets

(56) References Cited

U.S. PATENT DOCUMENTS

| | | | |
|---|---|---|---|
| 2015/0035830 A1 | 2/2015 | Zhang et al. | |
| 2016/0133048 A1* | 5/2016 | Acree | G06T 17/05 |
| | | | 345/426 |
| 2018/0149745 A1* | 5/2018 | Christianson | G01S 7/064 |
| 2018/0253893 A1 | 9/2018 | Shkolnikov | |
| 2019/0295315 A1* | 9/2019 | Levinson | G06T 17/20 |
| 2021/0141386 A1* | 5/2021 | Eshima | G01B 11/00 |
| 2021/0279948 A1* | 9/2021 | Hou | G06T 15/04 |
| 2022/0277163 A1* | 9/2022 | Stenneth | G06T 7/12 |
| 2023/0160714 A1* | 5/2023 | Apuy | G06T 11/001 |
| | | | 715/772 |

OTHER PUBLICATIONS

Co-pending U.S. Appl. No. 18/904,380, inventor Lutzenberger; Bert Jeffrey, filed on Oct. 2, 2024.

\* cited by examiner

METHODS AND SYSTEMS FOR PROVIDING A REAL-TIME VIEWSHED VISUALIZATION

CROSS-REFERENCE

This application claims priority to U.S. Provisional Patent Application No. 63/331,625 filed on Apr. 15, 2022, which application is incorporated herein by reference in its entirety for all purposes.

BACKGROUND

Outdoor activities are attracting more and more people, such as hunting, hiking, biking, camping, fishing, rafting, etc. Today, people rely heavily on digital maps on a computer screen, or on a mobile device screen to provide them with location information. While the existing digital maps provide general location information, they lack more detailed real-time information (e.g., terrain information) regarding a visualization of a location in terms of what is visible and what is not from that location.

SUMMARY

A sophisticated map with real-time rich visual information may be required to enhance users' experiences. It may help hunters, hikers, bikers, and the like to obtain real-time visualization of a location. Additionally, in the field of real estate planning, e.g., people generally want to know which location(s) on a parcel of land has the best view to build a house, etc. Further, in real estate planning, a house owner may want to know in advance, sometimes due to privacy concerns, what areas outside of the parcel of land may view the planned-to-built house. A map with visualization of the scene from different locations may be desired to achieve these needs. It can also be useful to provide users with a visualization of a city at any given point, e.g., on a rooftop of an apartment building, a certain unit in an office building, etc. Additionally, a map with visualization of the distance of an object and/or a location from a reference point may be desired.

The method and systems provided herein may provide the advantage of reducing the transmission burden and computation burden by utilizing the shadow mapping technique. This is especially desirable for hunter, hiking, and other outdoors activities, wherein the computational resources, transmission bandwidth and/or reception is often limited. In such cases, minimizing data transmission and reducing power demand (e.g., through less computation) greatly enhances the overall user experience.

Methods and systems are provided for allowing a real-time viewshed visualization using shadow mapping. The real-time viewshed visualization may provide rich visual information to hunters, outdoor enthusiasts, real estate planners, and the like, regarding what is visible and what is not visible from any given point on a terrain mesh. The real-time viewshed visualization may factor in various data/information when generating the viewshed visualization, such as sun-lit data at a certain time of a day, weather data, elevation data of the area showing, and the like. Some other data may include vegetation (e.g., trees) data, and mapping the shadow it may create at a given time of a day.

The methods and systems described herein may utilize shadow mapping technologies employed by raster-based three-dimensional (3D) graphics pipelines to simulate a viewshed. A viewshed is generally meaning what is visible at a given point (location), i.e., what is not under the shade of another object. In another word, the visible areas are the areas that do not have an object blocking the sun light or any other light. By simulating a viewshed for any given point (location), the methods and systems described herein can provide a user with a real-time visualization in terms of what areas/objects are visible from that given point. This real-time viewshed visualization is generated dynamically in real-time. By utilizing shadow mapping technologies, the methods and systems described herein can generate real-time viewshed visualization for an area in a fast, low-computational-cost manner and thus enhance users' experience.

In an aspect, the present disclosure provides a method for generating viewshed map for one or more client nodes, comprising (a) receiving a first set light source data associated with an area; (b) obtaining a set of elevation data associated with the area; (c) generating a shadow map based at least in part on the first set light source data and the elevation data associated with the area; (d) receiving interactive position data from the one or more client nodes; and (e) generating a real-time viewshed map visualization of the area by rendering the shadow map based on the interactive position data.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
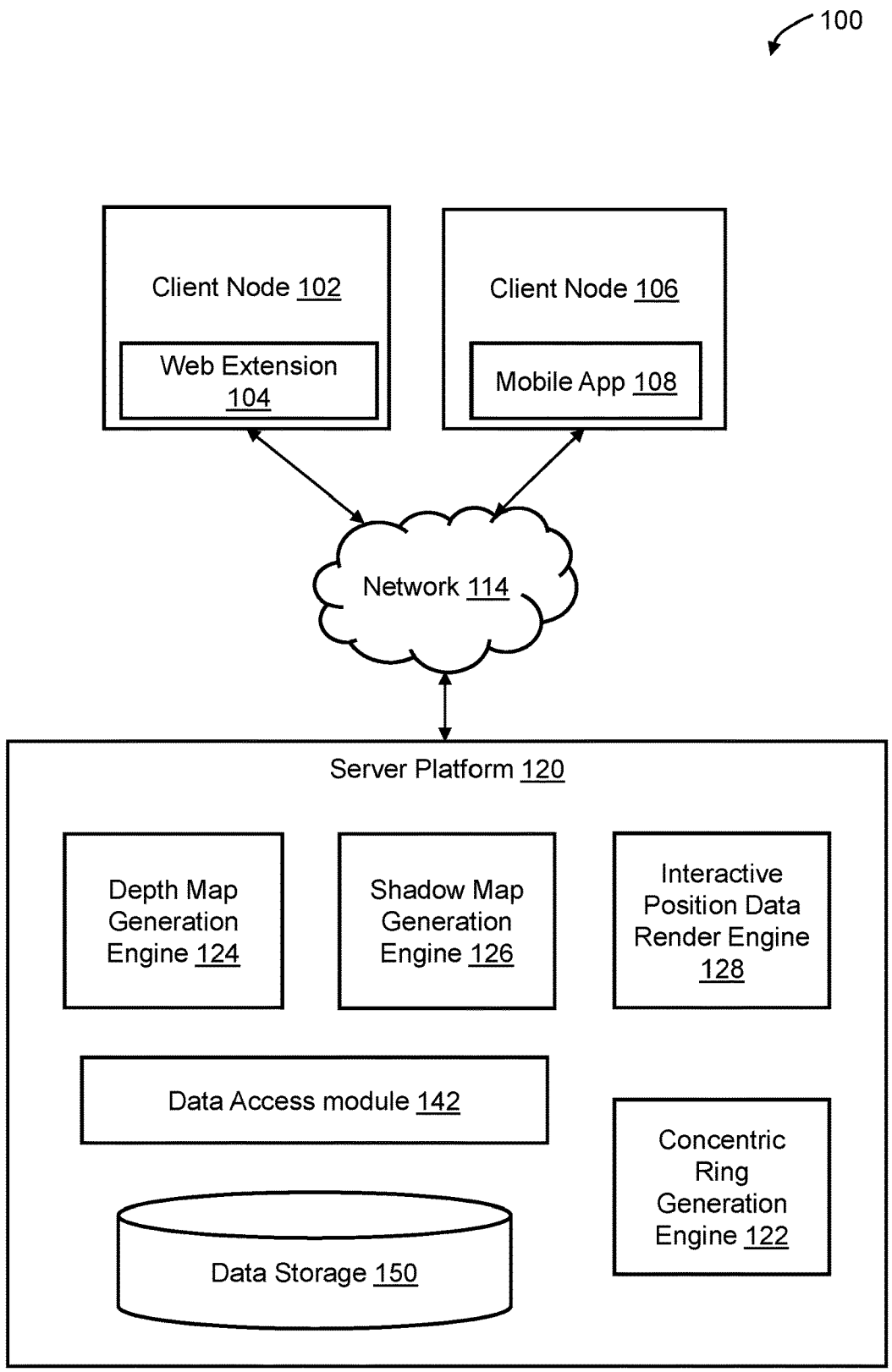
FIG. 1 is a block diagram depicting an example visualization system, according to embodiments of the present disclosure, comprising a client-server architecture and network configured to perform the various methods described herein.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The real-time viewshed visualization provided herein may provide a real-time visualization regarding what areas/sub-areas are visible because of a light source (e.g., sunlight, moonlight, street light, etc.), and what areas/sub-areas are not visible because of blockage of the light source by an object (e.g., a peak of a mountain, a slope of a mountain, a house, etc.). It may help hunters to know, in real-time or in advance, what areas/sub-areas are visible from a particular location. They may thereby, relying on the viewshed visualization, determine which location(s) to go for hunting, at what time. It may also help hikers, bikers, and other outdoor enthusiasts to plan for their adventures. In the field of real estate planning, e.g., which location(s) on a parcel of land has the best view to build a house, etc. this viewshed map with visualization of the scene from different locations is highly desired for planning.

The real-time visualization provided herein may also provide a real-time visualization of the views in a particular apartment unit at any given time of a day. This may help property managers to provide a virtual viewing for a potential tenant without having to physically show the unit. By utilizing not only the sun-lit data, elevation data, but also the vegetation data (e.g., trees that may be blocking a portion of the view), this real-time visualization provided herein can simulate the views in a very accurate manner.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real-time," as used herein, generally refers to a simultaneous or substantially simultaneous occurrence of a first event or action with respect to an occurrence of a second event or action. A real-time action or event may be performed within a response time of less than one or more of the following: ten seconds, five seconds, one second, a tenth of a second, a hundredth of a second, a millisecond, or less relative to at least another event or action. A real-time action may be performed by one or more computer processors. Real-time, as used herein, generally refers to a response time that does not appear to be of substantial delay to a user as graphical elements are pushed to the user via a user interface. In some embodiments, a response time may be associated with processing of data, such as by a computer processor, and may be less than 2 seconds, 1 second, tenth of a second, hundredth of a second, a millisecond, or less. Real-time can also refer to a simultaneous or substantially simultaneous occurrence of a first event with respect to the occurrence of a second event.

FIG. 1 is a block diagram depicting an example visualization system 100, according to embodiments of the present disclosure, comprising a client-server architecture and network configured to perform the various methods described herein. A platform (e.g., machines and software, possibly interoperating via a series of network connections, protocols, application-level interfaces, and so on), in the form of a server platform 120, provides server-side functionality via a communication network 114 (e.g., the Internet or other types of wide-area networks (WANs), such as wireless networks or private networks with additional security appropriate to tasks performed by a user) to one or more client nodes 102, 106. FIG. 1 illustrates, for example, a client node 102 hosting a web extension 104, thus allowing a user to access functions provided by the server platform 120, for example, receiving a viewshed visualization from the server platform 120. The web extension 104 may be compatible with any web browser application used by a user of the client node. Further, FIG. 1 illustrates, for example, another client node 106 hosting a mobile application 108, thus allowing a user to access functions provided by the server platform 120, for example, receiving a viewshed visualization from the server platform 120. In some embodiments, the mobile application 108 of the client node 106, and the web extension 104 of the client node 102 may transmit interactive position data to the server platform 120. The interactive position data may indicate a location point of interest on a map, and the server platform 120 may generate, in real-time or near real-time, a viewshed visualization from that location point to show the visible objects at that location point. In some embodiments, the interactive position data may also indicate, in addition to a location point, an elevation of the location point of the interest on a map. For example, a floor number of a high-rise building. Delivery of the viewshed visualization, interactive position data, and other communications, may be through a wired or wireless mode of communication.

A client node (e.g., client node 102 and/or client node 106) may be, for example, a user device. Examples of a user device may comprise a mobile electronic device, such as smart phones, cell phones, tablets, personal digital assistants, etc. In some embodiments, examples of a user device map comprise a stationary electronic device, such as desktops, laptops, etc. Examples of a user device may also comprise wearable devices such as smart watches, smart glasses, etc. These user devices are network enabled via various protocols, such as BGP, DHCP(v6), DNS, FTP, HTTP, HTTPS, IMAP, LAN, WAN, 4G, 5G, LTE, etc. A client node may be associated with, and/or be accessible to, a user. In another example, a client node may be a computing device (e.g., server) accessible to, and/or associated with, an individual or entity. A client node may comprise a network module (e.g., network adaptor) configured to transmit and/or receive data. Via the nodes in the computer network, multiple users and/or servers may communicate and exchange data, such as a viewshed visualization, interactive position data, and the like.

In at least some examples, the server platform 120 may be one or more computing devices or systems, storage devices, and other components that include, or facilitate the operation of, various execution modules depicted in FIG. 1. These modules may include, for example, depth map generation engine 124, shadow map generation engine 126, interactive position data render engine 128, concentric ring generation engine 122, data access modules 142, and data storage 150. Each of these modules is described in greater detail below. Any of these modules may be optional. In some instances one or more of these modules may not be included, or alternative modules may be provided. Modules may operate in conjunction as illustrated, or in any combination, or independently.

The depth map generation engine 124 may be configured to receive and/or obtain light source data associated with an area. In some embodiments, an example of the light source data is sunlight data at a certain time of a day. Sunlight data may comprise, without limitation, the season of a year (e.g., spring, summer, autumn, winter), the day of a year, the direction of the sunlight beams at one or more locations (e.g., Northern Hemisphere, Southern Hemisphere, latitude and longitude in the geographic coordinate system (GCS), and the like), the direction of the sunlight beams at a given time of a day, the intensity of sunlight at a given time of a day, and the like. In some embodiments, the light source data is the moonlight data at a certain time of a day. Moonlight intensity varies greatly depending on the lunar phase, but the light reflected by the moon may still provide visibility of objects. Moonlight data may comprise, without limitation, the day of a month (e.g., lunar phase), the direct of the moonlight beams on one or more locations (e.g., Northern Hemisphere, Southern Hemisphere, latitude and longitude in the geographic coordinate system (GCS), and the like), the direction of the moonlight beams at a given time of a day (in a sense, this refers to a given time of a night), the intensity of moonlight, and the like. In some embodiments, the light source data is the street light data at one or more locations. It should be noted that various alternatives to these examples of light source data described herein may be employed in practicing the invention.

The depth map generation engine 124 may be configured to receive and/or obtain elevation data associated with an area. The basic building block of a viewshed visualization is height-field based terrain, e.g., hills, mountains, etc. Because of the nature that lights rays travel in a straight line, a taller object blocks light beams and casts shadows on the blocked areas/objects. Elevation data associated with an area (e.g., a portion of the terrain, a subset of the terrain, a group of terrains) is indicative of the heights associated with each location of the terrain, respectively. Therefore, the elevation data may provide simulation of shadows in the terrain. In some embodiments, the elevation data may be generated by employing a digital elevation model (DEM). In some embodiments, the elevation data may be obtained from the National Election Dataset (NED). The NED dataset is a compilation of data from a variety of existing high-precision datasets such as LiDAR data (see also National LIDAR Dataset—USA), contour maps, USGS DEM collection, SRTM and other sources which were reorganized and combined into a seamless dataset, designed to cover all the United States territory in its continuity. The elevation data may be available in various data formats, such as ESRI ArcGRID, GeoTIFF, BIL, GridFloat, and the like.

The depth map generation engine 124 may be configured to receive and/or obtain peripheral data associated with an area. The peripheral data may include data regarding man-made structures in an area, such as a house, a cabin, a pier, a seawall, etc. In some other embodiments, the peripheral data may include nature-made objects in an area, such as trees, lakes, stones, etc. Trees may block sunlight to the extent of their heights. The data associated with trees may be updated gradually and continuously based on the height advancing speed (i.e., growing speed) of a certain type of tree, and may be adjusted based on actual measurements of their heights scheduled periodically.

The depth map generation engine 124 may be configured to generate a depth map based at least in part on the light source data and the elevation data. From the light source point of view, the depth map generation engine 124 may render the terrain of interest. In some embodiments, the light source is a directional light, i.e., a light source that is not in the scene and every light beam (i.e., ray) from the light source is parallel to each other, for example, sunlight, moonlight, etc. In this instance, an orthographic projection may be used to generate the depth map (i.e., depth buffer). Orthographic projection is a means of representing three-dimensional objects in two dimensions. It is a form of parallel projection, in which all the projection lines are orthogonal to the projection plane, resulting in every plane of the scene appearing in affine transformation on the viewing surface. In some embodiments, the light source is a point light source, i.e., the light is in the scene at a specific location, and it shines light equally in all directions, for example, street light source. In this instance, a perspective projection may be used to generate the depth map (i.e., depth buffer). Perspective projection is an approximate representation on a flat surface of an image as it is seen by the eye. Depending on the type of light source being rendered, the depth map generation engine 124 may select one or more of the projections to generate the depth map.

The depth map generation engine 124 may generate a depth map (i.e., depth buffer) to capture depth information of objects in the scene from a particular perspective. Modern computer graphics may use a raster-based 3D pipeline. The depth buffer may track the distance of polygon fragments from a point of view (i.e., a particular perspective). The term "polygon fragment" or "fragment" refers to the data necessary to generate a single pixel's worth of a drawing primitive in a computer graphic buffer. The value of the distance is mapped to a [0.0 . . . 1.0] format, wherein the value 0.0 represents a non-visible pixel (i.e., far away from the point of view, or blocked by another object), and the value 1.0 represents a pixel that is close and visible from the point of view. Every polygon fragment that is visible from the light source (i.e., point of view) is considered as lit, and everything that is hidden (i.e., being blocked by another object) is considered shaded. By rendering the scene from the light source's position, the depth map generation engine 124 generates a representation of a visualization of visible scenes from the light source's view, i.e., the depth map or depth buffer. The depth buffer or depth map may be updated, by the depth map generation engine 124, in real-time or near real-time, when there is a change in the light source data, a change of an object-in-the-scene's position, etc.

In some embodiments, the depth map generation engine 124 may determine whether there is another light source in the scene or shines to the scene. If there are multiple light sources in a scene, each light source may need a separate depth buffer due to the nature of the depth buffer: the depth buffer records the distance between an object (or a polygon fragment) and the light source, therefore, when there exists more than one light source, a separate depth buffer is needed. In this case, the depth map generation engine 124 may generate a second depth map for the second light source. The operations and mechanisms may mirror the ones for generating the first depth map as described elsewhere herein.

The shadow map generation engine 126 may generate a shadow map based at least in part on the depth map(s), according to some embodiments of the present disclosure. In some embodiments, the shadow map generation engine 126 may retrieve the depth maps generated by the depth map generation engine 124. In some embodiments, the shadow map generation engine 126 may check each pixel to determine whether it is visible from the light source's view. This determination may occur within a 3D graphics pipeline via depth testing. The shadow map generation engine 126 may use the depth information contained in the depth buffer to determine what pixels can be seen. The visible pixel would be on the shadow map and a matrix transformation may be utilized. By utilizing the matric transformation, the shadow map generation engine 126 may first ascertain a pixel's position on the shadow map, and then use the depth buffer to determine whether there is an object in front of that pixel along the direction of the light source. If there is an object in front of that pixel along the direction of the light source, then that pixel is blocked from the light source and thus should be invisible. For example, if a pixel represents a given location in a valley of a mountain, the shadow map generation engine 126 may ascertain the position of this pixel, then query the depth buffer to determine whether the light source's light shines on this location (i.e., whether there is an object that blocks the light). If there is no object in front of that pixel (i.e., the given location in the valley), then this pixel is a visible pixel on the shadow map and will be represented accordingly. If there is an object in front of that pixel (e.g., if the mountain peak is blocking the sun light at that time of a day), then this pixel is an invisible pixel on the shadow map and will be represented accordingly.

In another example, if a pixel representing a given location (e.g., an office building) and a given elevation (e.g., a certain floor of the building, for example, $15^{th}$ floor), the shadow map generation engine 126 may ascertain the position and of this pixel, then query the depth buffer to determine whether the light source's light shines on this location at the elevation pre-determined (i.e., whether there is an object that blocks the light if on the $15^{th}$ floor at a given time of a day). This visualization may provide a virtual viewing of a given unit in a high-rise building at any giving time so to enhance users' experiences. A potential tenant does not need to be physically in a unit for an extended period of time to get the sense of lighting and views of the room at any given time of a day. The potential tenant may simply choose the building and unit number, then choose different times of a day to see a visualization of that unit.

In some embodiments, the shadow map generation engine 126 may receive a set of weather data indicative of a real-time or near real-time weather condition associated with the area. For example, radar data that indicate weather conditions may be utilized. In some embodiments, the weather data may be obtained via public data source, social media data, etc, that indicate weather conditions. In some embodiments, the weather data may be obtained via one or more sensors, e.g., local sensors or remote sensors. The weather data may indicate a location of a cloud blocking a sunlight source, a moonlight source, etc. In some embodiments, the weather data may indicate motion of rain droplets and intensity of the precipitation, etc. The shadow map generation engine 126 may utilize this radar data indicative of a real-time or near real-time weather condition in addition to the depth map to generate the shadow map. For example, the shadow map generation engine 126 may factor in light source data and elevation data with the aim of the depth map generation engine 124 and utilize the radar data to generate a shadow map that is indicative of the light source, the elevation, and the real-time weather associated with an area.

The interactive position data render engine 128 may be configured to receive interactive position data from client nodes 102 and 106. In some embodiments, the interactive position data may comprise, without limitation, a user's selection of a point on a shadow map. For example, a user associated with a client node may select a location by touching a touch screen of a smart phone, by touching a touch screen of a smart watch, by commanding a computer mouse associated with a desktop on a graphical user interview of the desktop, etc. The interactive position data represents a location on the shadow map. In some embodiments, the interactive position data is indicative of a real-time physical position of the one or more client nodes. This real-time physical position may be obtained via an embedded Global Positioning System (GPS) of the client node. In some embodiments, the interactive position data may be generated automatically, by default, using the GPS data of the client node. In some other embodiments, the interactive position data may be generated, by default, based on a user selection of the location. In some further embodiments, the interactive position data may be generated using the GPS data of the client node, and with an option for the user to choose/select another location on a digital map. In yet further embodiments, the interactive position data may also include elevation data that may be input by a user (e.g., floor number, etc), or generated by an altitude meter of a mobile device. In some embodiments, the interactive position data may be generated using the GPS data of the client node, and with an option for the user to choose/select a different time/time range so to provide a visualization for a past or future view at the physical location where the user is located.

The interactive position data render engine 128 may generate a real-time viewshed visualization by rendering the shadow map based on the interactive position data. For example, as described elsewhere herein, this real-time viewshed visualization represents what a person/a camera may see at a given point (location). In a conceptual manner, this person or camera may be considered as an omnidirectional light source, and anything that is lit by this omnidirectional light source is something that is visible from that position. By rendering the shadow map in connection with the interactive position data, the interactive position data render engine 128 may generate a real-time viewshed visualization of an area that can be seen from the position of the interactive position data. In some embodiments, the interactive position data render engine 128 may render the shadow map in real-time or near real-time once received the interactive position data, and/or an update on the interactive position data. This allows a user (e.g., in connection with one or more client nodes) to move the selected position on a map and view the shadows and visible objects in real-time or near real-time associated with the selection position, for example, on a User Interface (UI) of a client node.

Optionally, a concentric ring generation engine 122 may be provided to generate concentric rings indicative of distances between a reference point (e.g., a center point, a user, a point that a user selected on the viewshed visualization, etc.) and a location. In some embodiments, one or more concentric rings may be generated and utilized to provide visualized distances from a reference point. In some embodiments, the concentric rings are generated in real-time, indicative of the real-time distance from a reference point. In some embodiments, the concentric rings are pre-generated and presented to a user in real-time in response to one or more user actions.

In some embodiments, the concentric ring generation engine 122 may retrieve one or more data sets from the depth map generation engine 124 and utilize the received data to aid in the generation of the concentric rings. For example, the concentric ring generation engine 122 may receive elevation data associated with an area and provide concentric rings that take the elevation data into account. In some embodiments, a concentric ring with the elevation data may not be a perfect circle, because of the slopes between the concentric ring and the reference point. In some embodiments, the concentric ring generation engine 122 may receive a depth map from the depth may generation engine 124 and utilize the depth may data to aid in the generation of the concentric rings. In some embodiments, the concentric ring generation engine 122 may receive interactive position data from the interactive position data render engine 128. As described elsewhere herein, this real-time viewshed visualization represents what a person/a camera may see at a given point (location). In some embodiments, this interactive position data may be chosen to be the reference point (i.e., center) of the concentric rings. In some embodiments, this reference point may be a real-time GPS data associated with one of the client nodes. In some embodiment, this reference point may be a real-time action received from a client node (e.g., a user device). In some embodiments, these concentric rings may be indicative of a distance from the reference point 801 to the concentric rings 805, 806, 807, and 808, respectively (see FIG. 8). In some embodiments, these concentric rings may be indicative of a distance from the one concentric ring to another concentric ring. Details of the concentric rings are described in further details in connection with FIG. 8.

Data access modules 142 may facilitate access to data storage 150 of the server platform 120 by any of the remaining modules/engines 124, 126, and 128 of the server platform 120. In one example, one or more of the data access modules 142 may be database access modules, or may be any kind of data access module capable of storing data to, and/or retrieving data from, the data storage 150 according to the needs of the particular modules 124, 126, and 128 employing the data access modules 142 to access the data storage 150. Examples of the data storage 150 include, but are not limited to, one or more data storage components, such as magnetic disk drives, optical disk drives, solid state disk (SSD) drives, and other forms of nonvolatile and volatile memory components.

At least some of the embodiments described herein with respect to the system 100 of FIG. 1 provide various techniques for generating, and delivering to client nodes, a viewshed visualization which is engageable, by user input, user activity, and/or user response. For example, the viewshed visualization may be engageable by user activity such as selecting a particular position/location on the viewshed visualization, and the like. The engagement of the viewshed visualization may cause the server platform 120 to recalculate the values needed to provide the viewshed visualization.

In some instances, the server platform 120 may only render a subset of the objects in the scene to the shadow map in order to save time to redraw the map based on predetermined rules. For example, if the system 100 determines that the client node requesting the viewshed visualization is working on a very low bandwidth interview connection, it may only render a subset of the objects of interest in the scene. In other examples, if the system 100 determines that the client node requesting the viewshed visualization is a mobile device with low hardware configurations (e.g., insufficient graphics computation or presentation ability), it may reduce the resolution of the viewshed visualization being sent to the client node.

The visualization system 100 described herein may provide the advantage of reducing the transmission burden and computation burden by utilizing the shadow mapping technique. This is especially desirable because in the scenario of hunter, hiking, and other outdoors activities, the transmission bandwidth/reception is often limited, and less data being transmitted enhances the overall user experience.

Figure 2:
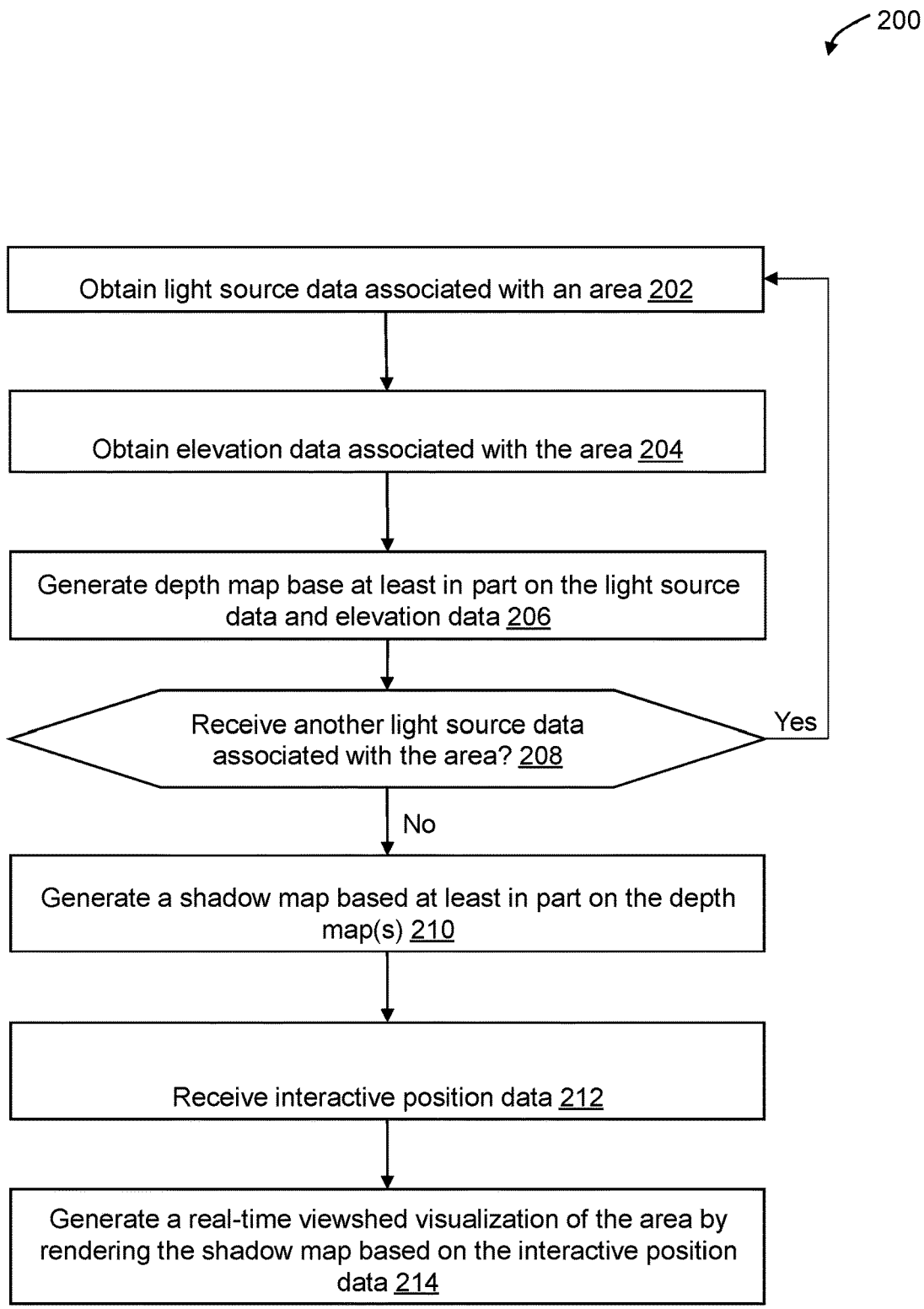
FIG. 2 is a flow diagram depicting an example process for providing a real-time viewshed visualization, according to one exemplary embodiment.

FIG. 2 is a flow diagram depicting an example process 200 for providing a real-time viewshed visualization, according to one exemplary embodiment. As depicted in FIG. 2, once the platforms and systems of the present disclosure are initialized, the process 200 begins with operation 202, wherein the system 100 obtains light source data associated with an area. In some embodiments, an example of the light source data is sunlight data at a certain time of a day. Sunlight data may comprise, without limitation, the season of a year (e.g., spring, summer, autumn, winter), the day of a year, the direction of the sunlight beams at one or more locations (e.g., Northern Hemisphere, Southern Hemisphere, latitude and longitude in the geographic coordinate system (GCS), and the like), the direction of the sunlight beams at a given time of a day, the intensity of sunlight at a given time of a day, and the like. In some embodiments, the light source data is the moonlight data at a certain time of a day. Moonlight intensity varies greatly depending on the lunar phase, but the light reflected by the moon may still provide visibility of objects. Moonlight data may comprise, without limitation, the day of a month (e.g., lunar phase), the direct of the moonlight beams on one or more locations (e.g., Northern Hemisphere, Southern Hemisphere, latitude and longitude in the geographic coordinate system (GCS), and the like), the direction of the moonlight beams at a given time of a day (in a sense, this refers to a given time of a night), the intensity of moonlight, and the like. In some embodiments, the light source data is the street light data at one or more locations. It should be noted that various alternatives to these examples of light source data described herein may be employed in practicing the invention.

In some embodiments, in operation 202 (or in any following operations), peripheral data may be received and/or obtained. The peripheral data may include data regarding man-made structures in an area, such as a house, a cabin, a pier, a seawall, etc. In some other embodiments, the peripheral data may include nature-made objects in an area, such as trees, lakes, stones, etc. Trees may block sunlight to the extent of their heights. The data associated with trees may be updated gradually and continuously based on the height advancing speed (i.e., growing speed) of a certain type of tree, and may be adjusted based on actual measurements of their heights scheduled periodically.

Next, the process 200 may proceed to operation 204, wherein the system 100 may obtain elevation data associated with the area. Elevation data associated with an area (e.g., a portion of the terrain, a subset of the terrain, a group of terrains) is indicative of the heights associated with each location of the terrain, respectively. Therefore, the elevation data may provide simulation of shadows in the terrain. In some embodiments, the elevation data may be generated by employing a digital elevation model (DEM). In some embodiments, the elevation data may be obtained from the National Election Dataset (NED). The NED dataset is a compilation of data from a variety of existing high-precision datasets such as LiDAR data (see also National LIDAR Dataset—USA), contour maps, USGS DEM collection, SRTM and other sources which were reorganized and combined into a seamless dataset, designed to cover all the United States territory in its continuity.

The process 200 may then continue to operation 206, wherein the system 100 generates a depth map based at least in part on the light source data and the elevation data. Specific operations for generating the depth map are described in detail elsewhere herein, for example, in connection with the description for depth map generation engine 124 by referring to FIG. 1.

Next, in operation 208, the system 100 may determine whether another light source data associated with the area is received. If the system 100 receives another light source data associated with the area, then the process 200 may proceed to repeat operations 202, 204, and 206 to generate another depth map. This is due to the nature of a depth map is a representation of one light source, and each light source in a scene needs to be accounted for and a separate depth map needs to be generated. If the system 100 does not receive another light source data associated with the area, then the process 200 may proceed to operation 210, wherein the system 100 may generate a shadow map based at least in part on the depth map(s). Specific operations for generating the shadow map are described in detail elsewhere herein, for example, in connection with the description for shadow map generation engine 126 by referring to FIG. 1.

Next, the process 200 may proceed to operation 212, wherein the system 100 receives interactive position data. In some embodiments, the system 100 may receive this interactive position data from a client node associated, and/or be accessible to, a user. In some embodiments, the interactive position data may comprise, without limitation, a user's selection of a point on a shadow map. The interactive position data represents a location on the shadow map. In some embodiments, the interactive position data is indicative of a real-time physical position of the one or more client nodes. Next, the process 200 may continue to operation 214, wherein the system 100 generates a real-time viewshed visualization of the area by rendering the shadow map based on the interactive position data. Specific operations for generating the viewshed visualization are described in detail elsewhere herein, for example, in connection with the description for interactive position data render engine 128 by referring to FIG. 1.

Figure 3:
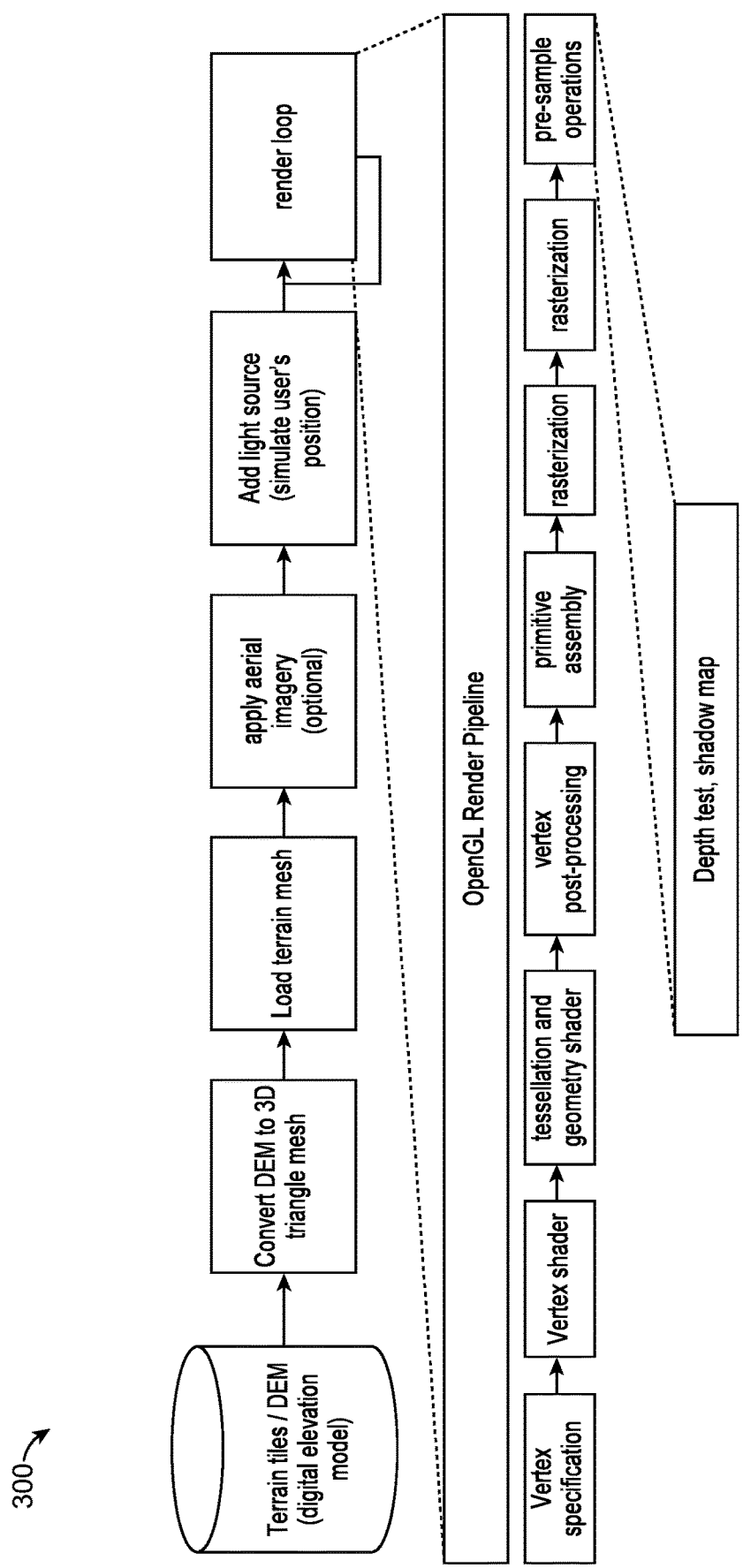
FIG. 3 is a flow diagram depicting an example process for providing a real-time viewshed visualization, according to one exemplary embodiment.

FIG. 3 is a flow diagram depicting an example process 300 for providing a real-time viewshed visualization, according to one exemplary embodiment. As depicted in FIG. 3, process 300 may comprise, without limitation, querying the terrain tiles/digital elevation model (DEM) database for terrain data (e.g., elevation data); converting DEM to 3D triangle mesh; loading, by one or more of the engines described in connection with FIG. 1, the terrain mesh; optionally applying aerial imagery to the terrain mesh; adding light source, by one or more of the engines described in connection with FIG. 1, for example, interactive position data render engine 128, to simulate a user's position; etc. In some embodiments, the interactive position data render engine 128 may rending a position or location that a user selected on a shadow map to generate the viewshed visualization at that location. Additionally or alternatively, process 300 may comprise, without limitation, obtaining vertex specification (e.g., vertex positions); in some embodiment, the vertex positions may be transformed using a model matrix, such as view matrix, projection matrix, and the like. The process 300 may comprise, obtaining vertex shader; in some embodiments, the vertex positions may be multiplied together and then passed to the vertex shader as a uniformed format. The process 300 may further comprise, without limitation, obtaining tessellation and geometry shader, conducting vertex post-processing, primitive assembly, rasterization, pre-sample operations. The process 300 may aim in depth testing process, wherein the system 100 renders the scene to ascertain which parts of the scene are hidden from the light source's point of view.

Figure 4:
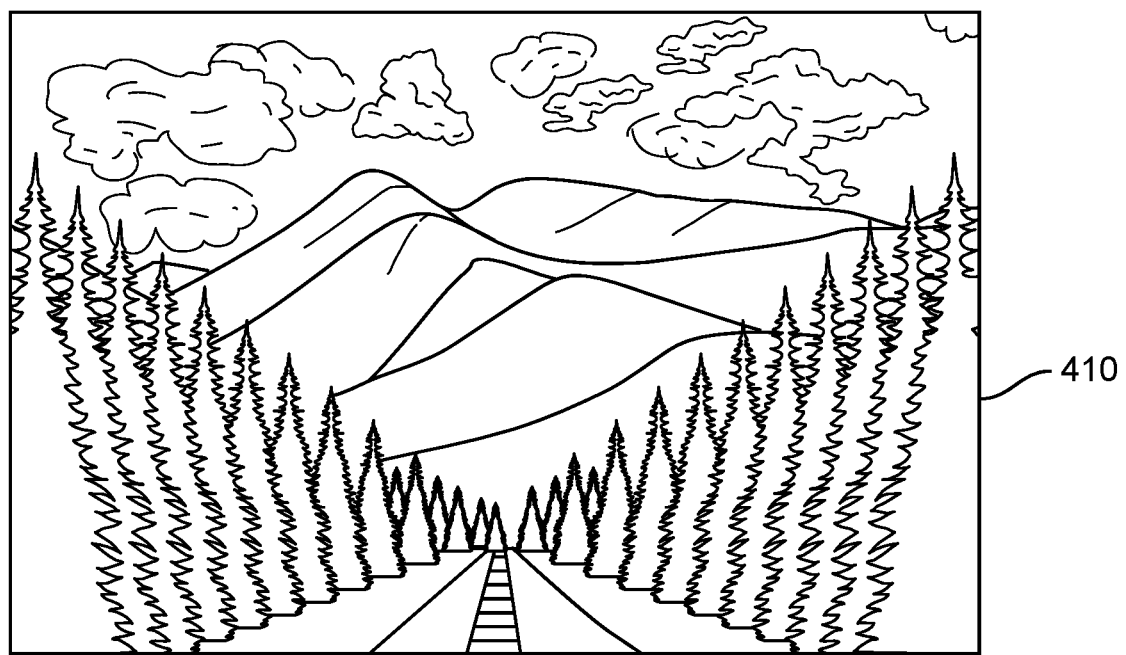
FIG. 4 illustrates an example viewshed visualization from a scene of a mountain, according to one exemplary embodiment.
Figure 4:
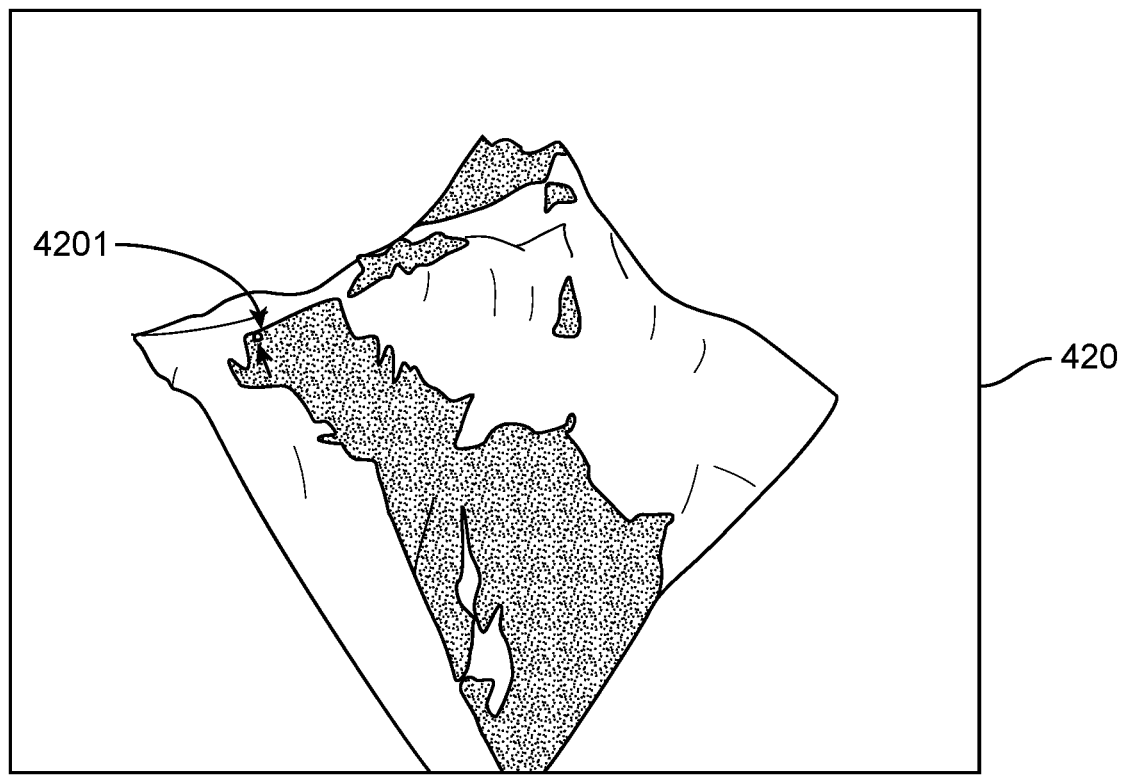

FIG. 4 illustrates an example viewshed visualization from a scene of a mountain, according to one exemplary embodiment. As depicted in FIG. 4, element 410 shows a mountain area, and element 420 shows a viewshed visualization corresponding to the mountain area. As depicted in FIG. 4, the viewshed visualization 420 may simulate what is visible at a reference point, e.g., reference point 4201 in FIG. 4. The visible areas at reference point 4201 may be shown as lighter color (e.g., red, pink, etc.) and the invisible areas at reference point 4201 may be shown as darker color (e.g., grey, black, etc.).

Figure 5:
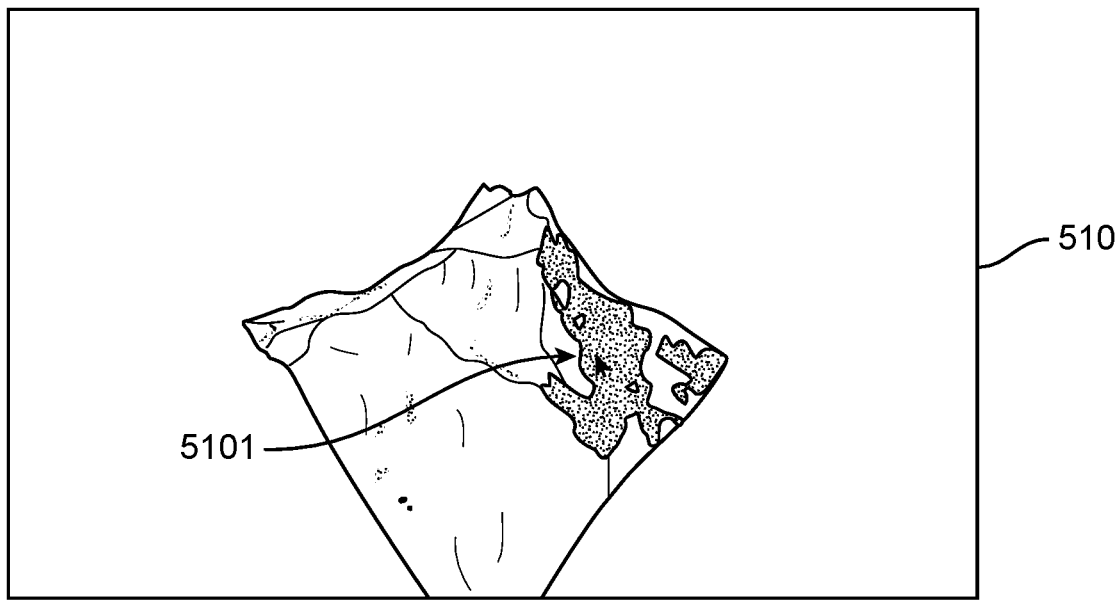
FIG. 5 illustrates a comparison of two viewshed visualizations at two different locations, according to one exemplary embodiment.
Figure 5:
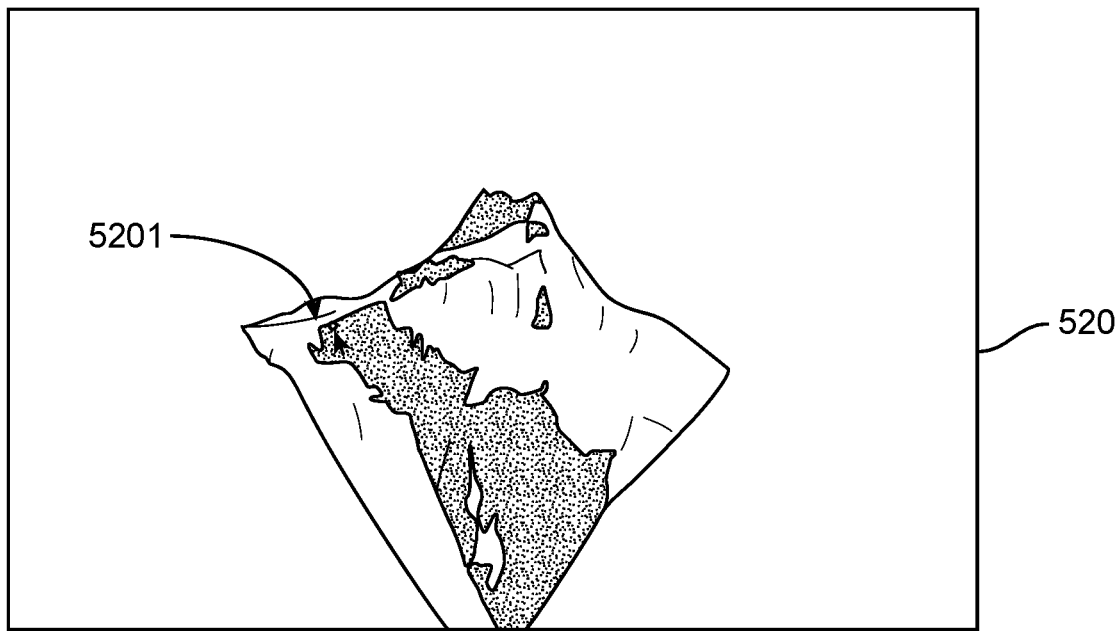

FIG. 5 illustrates a comparison of two viewshed visualizations at two different locations, according to one exemplary embodiment. As depicted in FIG. 5, the viewshed visualization 510 may simulate what is visible at a reference point, e.g., reference point 5101 in FIG. 5. The visible areas at reference point 5101 may be shown as visually discernible from invisible areas. In some embodiments, the visible areas are in different shade, color, pattern, outline, etc, than the non-visible deadlines. For example, the visible areas at reference point 5101 may be in lighter color (e.g., red, pink, etc.) and the invisible areas at reference point 5101 may be shown as darker color (e.g., grey, black, etc.). In some embodiments, the visible areas at reference point 5101 may be in a light shade than the invisible areas at reference point 5101. As depicted in FIG. 5, the viewshed visualization 520 may simulate what is visible at a reference point, e.g., reference point 5201 in FIG. 5. The visible areas at reference point 5201 may be shown as lighter color (e.g., red, pink, etc.) and the invisible areas at reference point 5201 may be shown as darker color (e.g., grey, black, etc.). As described elsewhere herein, the interactive position data render engine 128 may receive interactive position data from client nodes 102 and 106. Referring to FIG. 5, the interactive position data may represent the reference points 5101 and 5201. The interactive position data render engine 128 may generate a real-time viewshed visualization by rendering the shadow map based on the interactive position data, i.e., based on the reference points 5101 and 5201.

By rendering the shadow map in connection with the interactive position data, i.e., at one or more of the reference points, the interactive position data render engine 128 may generate a real-time viewshed visualization of an area that can be seen from the position of the interactive position data. In some embodiments, the interactive position data render engine 128 may render the shadow map in real-time or near real-time once receive the interactive position data, and/or an update on the interactive position data. This allows a user (e.g., in connection with one or more client nodes) to move the selected position on a map and view the shadows and visible objects in real-time or near real-time associated with the selection position, for example, on a User Interface (UI) of a client node. For example, when a user selected reference point 5101, the viewshed visualization 510 shows the shadows and visible objects in real-time or near real-time associated at the selected reference point 5101. When the user changed/updated the selection of reference point from reference point 5101 to reference point 5201, the interactive position data render engine 128 may render the shadow map in real-time or near real-time for the updated reference point 5201, and the generated viewshed visualization 520 shows the shadows and visible objects in real-time or near real-time associated at the selected reference point 5201.

Figure 7:
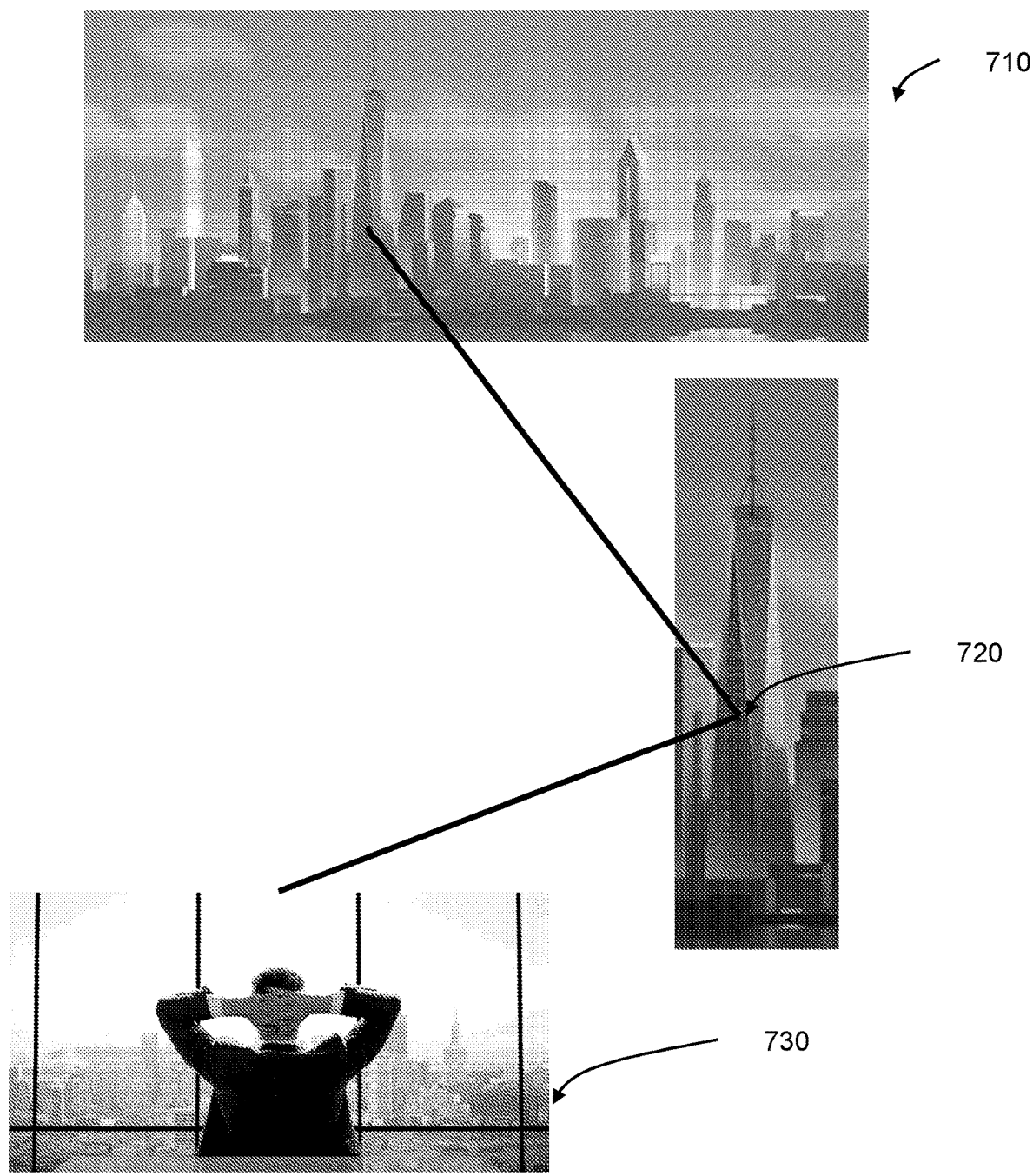
FIG. 7 illustrates an example viewshed visualization from a scene of an office unit, according to one exemplary embodiment.

FIG. 7 illustrates an example viewshed visualization from a scene of an office unit, according to one exemplary embodiment. As depicted in FIG. 7, element 710 shows a city skyline with a number of skyscrapers in the scene. A user may be interested to see what the views look like in one of the units in one of the skyscrapers, for example, a viewshed visualization for what is visible at a reference point, e.g., reference point 720. In this example, the interactive position data may be obtained, i.e., the exact location of the building. Additionally, the elevation data (e.g., floor number) may be obtained to facilitate a viewshed visualization. The orientation of a particular unit may also be taken into consideration when generating the viewshed visualization. The visible areas are shown in the viewshed visualization. In some embodiments, the visible areas are in different shade, color, pattern, outline, etc, than the non-visible deadlines. As depicted in FIG. 7, element 730 shows an exemplary view from an office unit, i.e., what are visible and what are not visible at a reference point, i.e., reference point 720 in this case. Notice that not only the shadows from sunlight are shown in element 730, the buildings in sights and their relative heights are also taken into consideration. In this manner, the viewshed visualization may provide a user with a real-time view of a given unit of a building in a city at any given time. This may drastically improve users' experiences because a user does not need to be physically in a unit for an extended period of time to get the sense of lighting and views of the room at any given time of a day.

Figure 8:
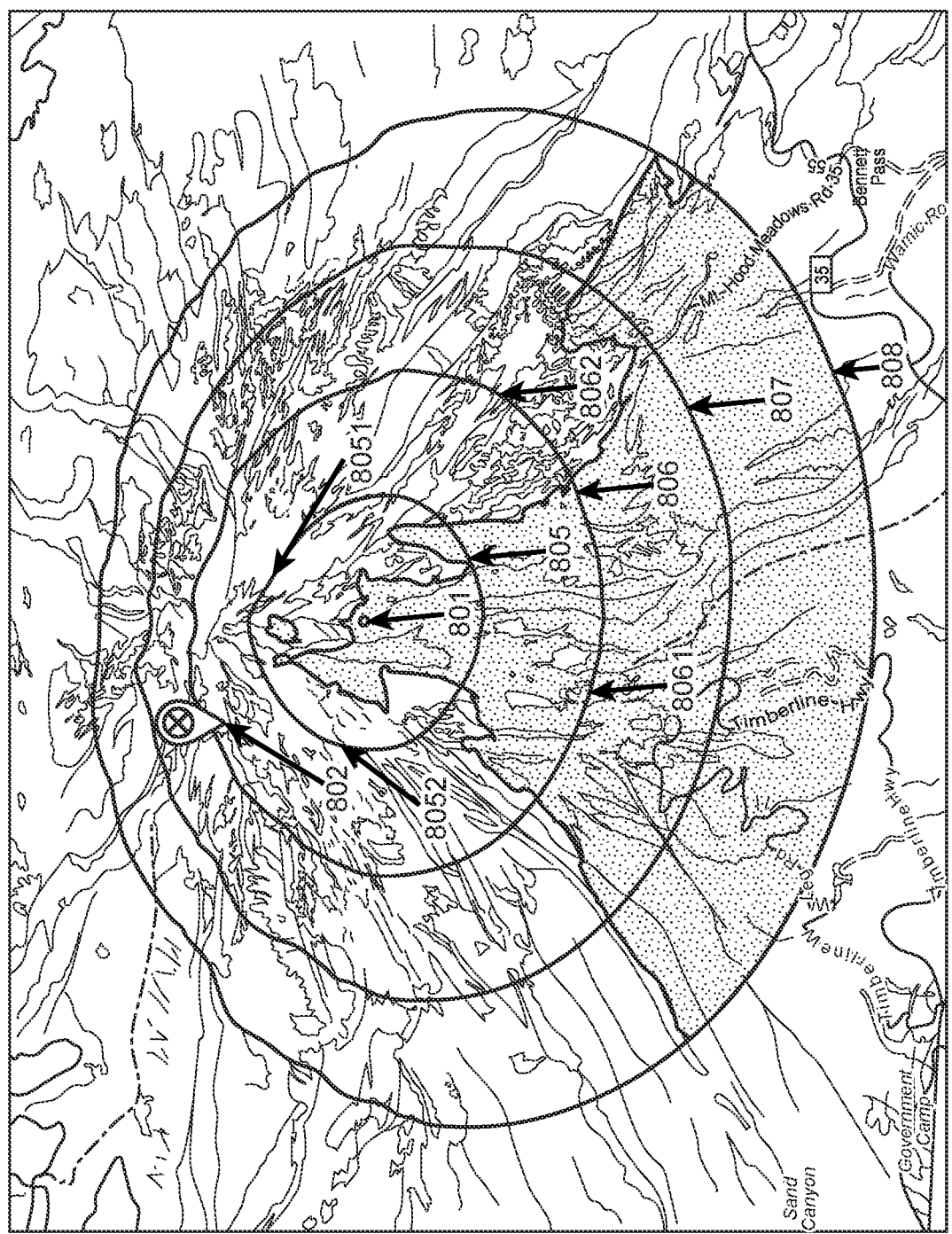
FIG. 8 illustrates an example viewshed visualization from a scene of a mountain with concentric rings visualizations, according to one exemplary embodiment.

FIG. 8 illustrates an example viewshed visualization from a scene of a mountain with concentric rings visualizations, according to one exemplary embodiment. As depicted in FIG. 8, one or more concentric rings 805, 806, 807, and 808 may be provided to the viewshed visualization to indicate a distance from a reference point 801. These concentric rings may be indicative of a distance from the reference point 801 to the concentric rings, respectively. Additionally or alternatively, these concentric rings may be indicative of a distance from the one concentric ring to another concentric ring. In some embodiments, the distances may be horizontal distance between the reference point 801 to the concentric rings, i.e., the distance along the horizontal direction. In some embodiments, the distances may be an actual distance, i.e., counting the distance that the slopes in between take, between the reference point 801 to the concentric rings. For example, the concentric ring generation engine 122 may receive elevation data associated with an area from the depth map generation engine 124, and utilize this elevation data to calculate an elevation gain or loss between two points. This elevation gain or loss may be taken into consideration when generating the concentric rings to provide the actual distance concentric rings.

In some embodiments, the viewshed visualization may provide a user an option to select between different modes. In some embodiments, the viewshed visualization may provide a user an option to select between different modes in terms of distance in between. For example, the viewshed visualization may provide a user an option to select the distances between each concentric rings to be, for example, be 5 meters, 10 meters, 50 meters, 100 meters, 500 meters, 1 kilometers, 2 kilometers, 3 kilometers, 4 kilometers, 5 kilometers, 10 kilometers, 15 kilometers, 20 kilometers, 30 kilometers, 40 kilometers, 50 kilometers, 100 kilometers, etc. In another example, the viewshed visualization may provide a user an option to select the distances between each concentric rings to be, for example, 5 feet, 10 feet, 50 feet, 100 feet, 500 feet, 1 mile, 2 miles, 3 miles, 4 miles, 5 miles, 10 miles, 15 miles, 20 miles, 30 miles, 40 miles, 50 miles.

In some embodiments, the viewshed visualization may provide a user an option to select between different modes in terms of showing the horizontal distance and/or actual distance. In some embodiments, the viewshed visualization may provide a user an option to select how much information the user would like to see. In some embodiments, if the concentric rings are indicative of the horizontal distances, the viewshed visualization may show additional information regarding the elevation gains or losses (i.e., slopes) between the references 801 to the concentric rings. For example, at a giving reference point 8051 of the concentric ring 805, it may include a note of "the elevation gain is 81 meters." In another example, at another giving reference point 8502 of the concentric ring 805, it may include a note of "the elevation gain is 54 meters." In some embodiments, if the concentric rings are indicative of the actual distances between the reference point 801 and the concentric rings, respectively, the viewshed visualization may show additional information regarding the horizontal distance and/or the elevation changes. For example, at a giving reference point 8061 of the concentric ring 806, it may include a note of "the horizontal distance is 460 meters" and/or "the elevation gain is 40 meters". In another example, at another giving reference point 8602 of the concentric ring 806, it may include a note of "the horizontal distance is 360 meters" and/or "the elevation gain is 140 meters." The distance between each concentric rings may be fixed and equal to one another. For example, the distance between the reference point 801 and the concentric ring 805, the distance between the concentric ring 805 and the concentric ring 806, the distance between the concentric ring 806 and the concentric ring 807, the distance between the concentric ring 807 and the concentric ring 808, may be all equal to one another. For example, the distance may be greater than, less than, equal to, or falling between any two of the following: 5 meters, 10 meters, 50 meters, 100 meters, 500 meters, 1 kilometers, 2 kilometers, 3 kilometers, 4 kilometers, 5 kilometers, 10 kilometers, 15 kilometers, 20 kilometers, 30 kilometers, 40 kilometers, 50 kilometers, 100 kilometers, etc. In another example, the distance may be greater than, less than, equal to, or falling between any two of the following: 5 feet, 10 feet, 50 feet, 100 feet, 500 feet, 1 mile, 2 miles, 3 miles, 4 miles, 5 miles, 10 miles, 15 miles, 20 miles, 30 miles, 40 miles, 50 miles. It should be noted that various alternatives to these examples of distances described herein may be employed in practicing the invention. In some embodiments, the distance between each concentric rings may not be fixed and may follow an arithmetic sequence, (e.g., an incrementing sequence or a descending sequence), an exponential growth sequence, a logarithmic growth sequence, etc. In some embodiments, the viewshed visualization may provide a user an option to select between different modes in terms of the different types of progression. In some embodiments, the distance between each concentric rings may follow an incrementing sequence. For example, the distance between the reference point 801 and the concentric ring 805, the distance between the concentric ring 805 and the concentric ring 806, the distance between the concentric ring 806 and the concentric ring 807, the distance between the concentric ring 807 and the concentric ring 808, may be 3 miles, 5 miles, 7 miles, 9 miles, respectively. It should be noted that various alternatives to the example of common difference between the distances described herein may be employed in practicing the invention. In some embodiments, a user may customize the distance between each concentric rings to fit the user's need.

In some embodiments, the concentric ring generation engine 122 may provide one or more sets of suggestions regarding the configuration of the concentric rings. In some embodiments, the suggestions may be made based on the terrain type. For example, for different types of terrains, the system 100 may provide different suggestions and/or set as default for displaying the viewshed visualization and/or the concentric rings. If the terrain is relatively flat, for example, in a city or in a plain or grassland, a horizontal distance for the concentric rings may be provided as suggestions or as default for displaying the concentric rings. If the terrain is relatively steep and with a large amount of up and down hills, an actual distance for the concentric rings may be provided as suggestions or as default for displaying the concentric rings, so that a user may have a better understanding of the actual distance between two given points. Additionally or alternatively, the distance between concentric rings may be part of the suggestion or default display of the concentric rings. For example, if a screen of a user device is displaying a relatively small area, e.g., 50 spare meters, the distance between concentric rings may be preset to be less than or equal to, e.g., 10 meters. The goal, in some embodiments, is to ensure that the user will be able to see at least 1, 2, 3, 4, or 5 concentric rings. Therefore, the suggestion/default setting will avoid a situation that the first ring covers a bigger area than what can be shown on the user's screen. In some embodiments, the default setting may be dynamically updated based on user actions, for example, zoom in and/or zoom out action.

In some embodiments, the suggestions may be made based on a function that the user is using the viewshed map for. In some embodiments, if a user uses the viewshed map for real estate survey, the system 100 may provide a set of default setting fit this purpose. For example, the user may care about more about the horizontal distance in a greater deal in this situation. When a user uses the viewshed map for another purpose, for example, hunting, the system may provide a different set of default setting fit this purpose. For example, the user may care about the actual distance in a greater deal in this situation. For different functions that the user is using the viewshed map for, the system may provide different pre-settings to fit the user's needs. However, as described herein elsewhere, a user may make adjustment to generate his or her own customized views.

The number of concentric rings that are visible may vary depending on the increments of distances between each concentric rings. For example, if the distance between each concentric ring is 5 miles, and the viewshed visualization is only showing a 30 spare miles area, there may be only one concentric ring. If the user zooms in and/or out of the viewshed visualization, for example, via a set of configurations on the screen of a user device, the viewshed visualization may be reconfigured to show more or less of the concentric rings.

In some embodiments, the concentric rings are dynamically generated and presented to the user in real-time or near real-time. For example, if a user (e.g., reference point 801) moves from location 1 to location 2, the concentric rings may be re-configured to show the distances from location 2. With this automation of the concentric rings, the viewshed visualization may present to a user a comprehensive visualization of not only what are visible/not visible from a reference point, but also the distances between the reference point to one or more objects. For example, point of interest 802 is located between concentric rings 805 and 806, if we assume the distances between each ring is 5 miles, the viewshed visualization provides an intuitive indication that 802 is between 5-10 miles from the reference point 801, and it is not visible from reference point 801 (because it shows as dark in the viewshed visualization map). Additionally, in some embodiments, depending on user configurations, the viewshed visualization may provide further information such as "there is a 1 mile elevation gain between ring 806 and 805." This may provide further information for users to plan for their adventures.

Computer Systems

Figure 6:
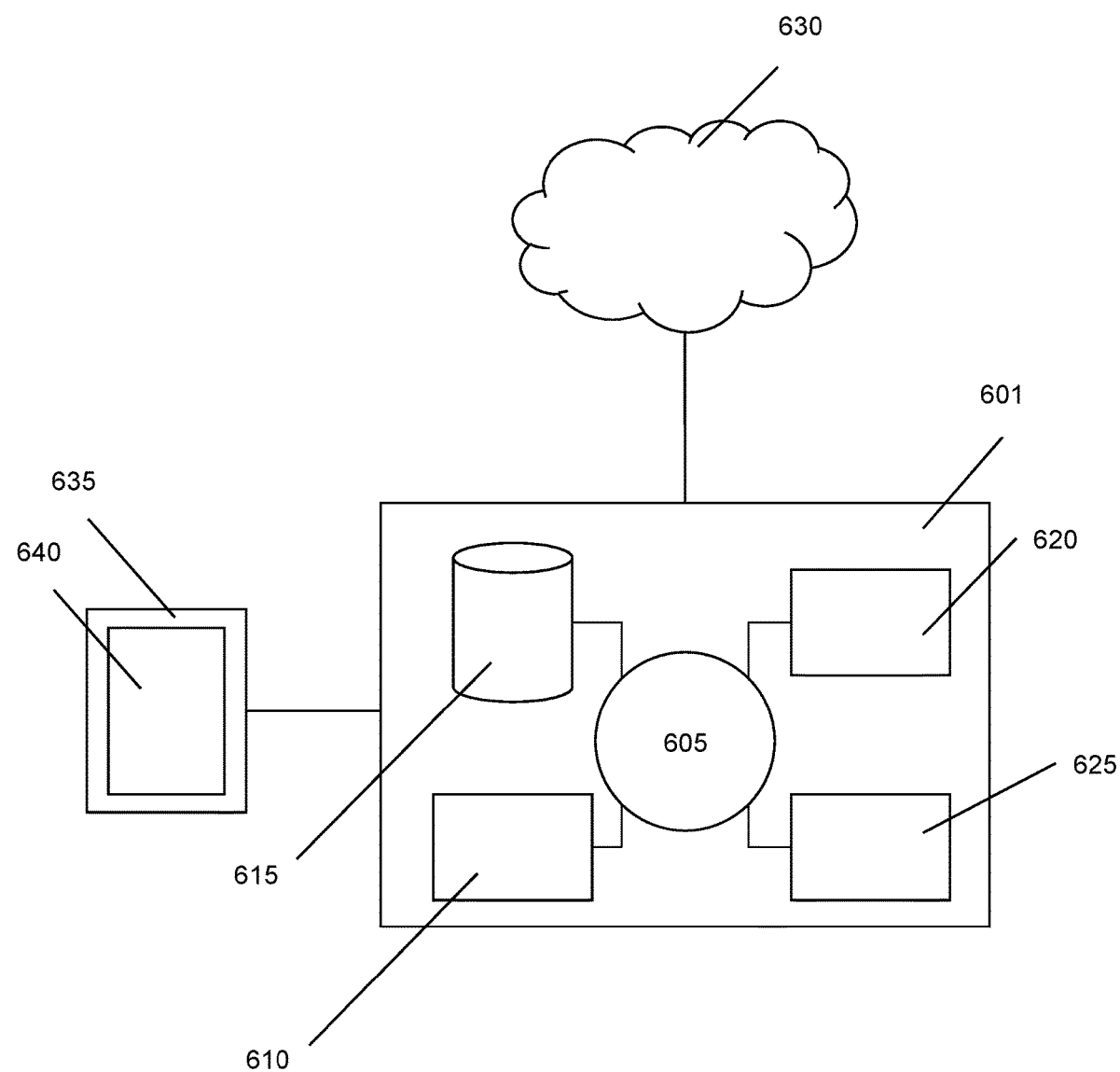
FIG. 6 shows a computer system that is programmed or otherwise configured to implement methods provided herein.

The present disclosure provides computer systems that are programmed to implement methods of the disclosure. FIG. 6 shows a computer system 601 that is programmed or otherwise configured to provide a real-time viewshed visualization. The computer system 601 can regulate various aspects of the present disclosure. The computer system 601 can be an electronic device of a user or a computer system that is remotely located with respect to the electronic device. The electronic device can be a mobile electronic device.

The computer system 601 includes a central processing unit (CPU, also "processor" and "computer processor" herein) 605, which can be a single core or multi core processor, or a plurality of processors for parallel processing. The computer system 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage and/or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The computer system 601 can be operatively coupled to a computer network ("network") 630 with the aid of the communication interface 620. The network 630 can be the Internet, an internet and/or extranet, or an intranet and/or extranet that is in communication with the Internet. The network 630 in some cases is a telecommunication and/or data network. The network 630 can include one or more computer servers, which can enable distributed computing, such as cloud computing. The network 630, in some cases with the aid of the computer system 601, can implement a peer-to-peer network, which may enable devices coupled to the computer system 601 to behave as a client or a server.

The CPU 605 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and writeback.

The CPU 605 can be part of a circuit, such as an integrated circuit. One or more other components of the system 601 can be included in the circuit. In some cases, the circuit is an application specific integrated circuit (ASIC).

The storage unit 615 can store files, such as drivers, libraries and saved programs. The storage unit 615 can store user data, e.g., user preferences and user programs. The computer system 601 in some cases can include one or more additional data storage units that are external to the computer system 601, such as located on a remote server that is in communication with the computer system 601 through an intranet or the Internet.

The computer system 601 can communicate with one or more remote computer systems through the network 630. For instance, the computer system 601 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 601 via the network 630.

Methods as described herein can be implemented by way of machine (e.g., computer processor) executable code stored on an electronic storage location of the computer system 601, such as, for example, on the memory 610 or electronic storage unit 615. The machine executable or machine readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 601 can include or be in communication with an electronic display 635 that comprises a user interface (UI) 640. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 605.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for generating a viewshed map for one or more client nodes, the method comprising:
    (a) receiving a first set of light source data associated with an area;
    (b) obtaining a set of elevation data associated with the area;
    (c) generating a shadow map based at least in part on the first set of light source data and the elevation data associated with the area;
    (d) receiving interactive position data from the one or more client nodes, wherein the interactive position data comprises a location of a reference point of view on the shadow map; and
    (e) generating a real-time viewshed map visualization of the area as visible from a perspective of the reference point of view based at least in part on the shadow map and the interactive position data.

2. The method of claim 1, further comprising, subsequent to (b), receiving a second set of light source data associated with the area.

3. The method of claim 2, wherein (c) further comprises generating the shadow map based at least in part on the first set of light source data, the second set of light source data, and the elevation data associated with the area.

4. The method of claim 1, further comprising, subsequent to (b), receiving a set of radar data indicative of a real-time weather condition associated with the area.

5. The method of claim 4, wherein (c) further comprises generating the shadow map based at least in part on the first set of light source data, the set of radar data, and the elevation data associated with the area.

6. The method of claim 1, wherein the interactive position data is indicative of a real-time position of the one or more client nodes.

7. The method of claim 1, wherein the interactive position data is indicative of a user's choice of a location of the area via an API.

8. The method of claim 1, further comprising, subsequent to (d), generating a plurality of concentric rings for presentation in the real-time viewshed map visualization.

9. The method of claim 8, wherein each of the plurality of concentric rings is indicative of a distance from position of the interactive position data to each of the plurality of concentric rings, respectively.

10. The method of claim 9, wherein the distance is a horizontal distance, an actual distance, or a combination thereof.

11. A non-transitory computer-readable medium comprising machine-executable code that, upon execution by one or more computer processors, implements a method for generating a viewshed map for one or more client nodes, the method comprising:
    (a) receiving a first set of light source data associated with an area;
    (b) obtaining a set of elevation data associated with the area;
    (c) generating a shadow map based at least in part on the first set of light source data and the elevation data associated with the area;
    (d) receiving interactive position data from the one or more client nodes, wherein the interactive position data comprises a location of a reference point of view; and
    (e) generating a real-time viewshed map visualization of the area as visible from a perspective of the reference point of view based at least in part on by rendering the shadow map and the interactive position data.

12. The non-transitory computer-readable medium of claim 11, further comprising, subsequent to (b), receiving a second set of light source data associated with the area.

13. The non-transitory computer-readable medium of claim 12, wherein (c) further comprises generating the shadow map based at least in part on the first set of light source data, the second set of light source data, and the elevation data associated with the area.

14. The non-transitory computer-readable medium of claim 11, further comprising, subsequent to (b), receiving a set of radar data indicative of a real-time weather condition associated with the area.

15. The non-transitory computer-readable medium of claim 14, wherein (c) further comprises generating the shadow map based at least in part on the first set of light source data, the set of radar data, and the elevation data associated with the area.

16. The non-transitory computer-readable medium of claim 11, wherein the interactive position data is indicative of a real-time position of the one or more client nodes.

17. The non-transitory computer-readable medium of claim 11, wherein the interactive position data is indicative of a user's choice of a location of the area via an API.

18. The non-transitory computer-readable medium of claim 11, further comprising, subsequent to (d), generating a plurality of concentric rings for presentation in the real-time viewshed map visualization.

19. The non-transitory computer-readable medium of claim 18, wherein each of the plurality of concentric rings is indicative of a distance from position of the interactive position data to each of the plurality of concentric rings, respectively.

20. The non-transitory computer-readable medium of claim 19, wherein the distance is a horizontal distance, an actual distance, or a combination thereof.

* * * * *